(12) United States Patent
Stark

(10) Patent No.: US 11,738,296 B2
(45) Date of Patent: Aug. 29, 2023

(54) FILTER DEVICE, IN PARTICULAR FOR GAS FILTRATION

(71) Applicant: MANN+HUMMEL GmbH, Ludwigsburg (DE)

(72) Inventor: Dennis Stark, Mauer (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 595 days.

(21) Appl. No.: 16/708,523

(22) Filed: Dec. 10, 2019

(65) Prior Publication Data

US 2020/0179852 A1 Jun. 11, 2020

(30) Foreign Application Priority Data

Dec. 10, 2018 (DE) ..................... 10 2018 131 526.0

(51) Int. Cl.
| | |
|---|---|
| *B01D 46/00* | (2022.01) |
| *B01D 46/24* | (2006.01) |
| *B01D 29/11* | (2006.01) |
| *B01D 29/00* | (2006.01) |
| *B01D 29/33* | (2006.01) |

(52) U.S. Cl.
CPC .......... *B01D 46/001* (2013.01); *B01D 46/24* (2013.01); *B01D 29/0063* (2013.01); *B01D 29/114* (2013.01); *B01D 29/33* (2013.01); *B01D 2201/16* (2013.01); *B01D 2201/302* (2013.01); *B01D 2201/304* (2013.01); *B01D 2201/40* (2013.01)

(58) Field of Classification Search
CPC .. B01D 46/001; B01D 46/24; B01D 29/0063; B01D 29/114; B01D 29/33; B01D 2201/16; B01D 2201/302; B01D 2201/304; B01D 2201/40; B01D 2265/06; B01D 46/0046; B01D 46/48; B01D 46/71; B01D 46/2411
USPC ....... 210/106, 108, 188, 315, 218, 338, 393, 210/411, 425, 427, 333.01, 342; 55/490, 55/492, 502, 482, 282, 410, 505, 506, 55/301, 430, 302; 95/20, 279, 278; 96/397
See application file for complete search history.

(56) References Cited

U.S. PATENT DOCUMENTS

| | | | |
|---|---|---|---|
| 8,382,870 B2 | 2/2013 | Troxell et al. | |
| 2011/0011042 A1* | 1/2011 | Gillingham | B01D 46/48 55/302 |

FOREIGN PATENT DOCUMENTS

| | | |
|---|---|---|
| CN | 108397318 A | 8/2018 |
| DE | 102016007788 A1 | 12/2017 |
| EP | 1866054 B1 | 12/2007 |
| EP | 2061576 B1 | 5/2009 |

* cited by examiner

*Primary Examiner* — Madeline Gonzalez

(57) ABSTRACT

A filter device has a filter housing and a filter element arranged in the filter housing. The filter element at least partially encloses an inwardly positioned flow chamber. A purified medium can be discharged from the filter device through a flow socket provided with a wall that has an opening. A fastening flange is arranged at the wall of the flow socket adjacent to the opening, wherein a purging gas pipe of a purging device can be detachably fastened by the fastening flange to the flow socket. The opening in the wall of the flow socket receives the purging gas pipe.

17 Claims, 3 Drawing Sheets

FILTER DEVICE, IN PARTICULAR FOR GAS FILTRATION

CROSS-REFERENCE TO RELATED APPLICATION

This application claims a priority date of 10 Dec. 2018 based on prior filed German patent application No. 10 2018 131 526.0, the entire contents of the aforesaid German patent application being incorporated herein by reference in its entirety to the fullest extent permitted by the law.

TECHNICAL FIELD

The invention relates to a filter device, in particular for gas filtration, for example, an air filter, with a filter housing and a filter element received in the filter housing, wherein the filter element comprises at least a filter medium body and a flow chamber that is at least partially enclosed by the filter medium body. The filter device comprises a flow socket for discharging the purified medium from the flow chamber, wherein in the wall of the flow socket at least one opening is provided.

BACKGROUND OF THE INVENTION

WO 2018/001892 A1 discloses a filter device for filtration of combustion air for internal combustion engines. The filter device comprises a filter housing and a hollow cylindrical filter element received therein that is flowed through by the air to be purified radially from the exterior to the interior. The purified air is discharged from the inwardly positioned flow chamber axially through a discharge socket at the housing.

In order to be able to clean off deposits at the raw side of the filter medium body of the filter element, the filter device is provided with a purging device with which purging gas is introduced via the discharge socket into the inwardly positioned flow chamber, flows through the wall of the filter medium body from the clean side to the raw side, and detaches deposits on the raw side by means of a pressure pulse. The purging device comprises a pipe elbow that passes through an opening in the wall of the discharge socket and is connected to the discharge socket.

SUMMARY OF THE INVENTION

It is the object of the invention to configure with simple constructive measures a filter device in such a way that, as needed, the filter device can be supplemented with a purging device.

This object is solved according to the invention in that a fastening flange for detachable fastening of a purging gas pipe of a purging device is arranged at the wall of the flow socket adjacent to the opening.

The dependent claims provide expedient further developments.

The filter device according to the invention is preferably used for gas filtration, for example, for filtration of air, in particular in the intake manifold of an internal combustion engine of a vehicle. The filter device comprises a filter housing and a filter element received in the filter housing that encloses at least partially a flow chamber. In a preferred embodiment, the filter element is configured as a round filter element and comprises, for example, the shape of a hollow cylinder.

The filter element comprises a filter medium body which is flowed through by the medium to be purified radially from the exterior to the interior so that the inwardly positioned flow chamber that is enclosed at least partially by the filter medium body forms the clean chamber for receiving the purified medium. The purified medium that is received in the inwardly positioned flow chamber is discharged through a flow socket from the filter device.

The wall of the flow socket is provided with at least one opening, adjacent to which a fastening flange is arranged at the flow socket. The fastening flange serves for detachable fastening of a purging gas pipe of a purging device with which deposits can be cleaned off the filter medium body. Through the purging gas pipe of the purging device, a purging medium is introduced under pressure into the inwardly positioned flow chamber, whereupon the deposits at the exterior side of the filter medium body become detached by the pressure pulse of the purging medium.

The purging gas pipe of the purging device is fastenable by means of the fastening flange to the flow socket, wherein the fastening flange adjoins the opening of the flow socket. The fastening is reversible so that, as needed, the purging gas pipe can also be removed again from the flow socket. Also, this configuration provides the possibility of furnishing, depending on the desired configuration, filter devices with or without purging devices. In case no purging device is provided, the fastening flange serves for receiving and detachably fastening a closure lid that closes off the opening in the wall of the flow socket.

If desired, the filter device can also be furnished at a later time with a purging device. For this purpose, only the closure lid must be removed and the purging gas pipe of the purging device must be guided through the opening in the wall of the flow socket, wherein the purging gas pipe can be fastened by means of the fastening flange.

As needed, it may be advantageous to provide in the wall of the flow socket more than one opening, for example, two or more than two openings that each have correlated therewith a fastening flange. This provides the possibility of arranging a corresponding number of purging gas pipes at the flow socket and, in this way, generate a pressure pulse for cleaning purposes for improvement of the cleaning performance. For example, it can be expedient to introduce a total of two flow openings into the wall of the flow socket wherein the openings are positioned diametrically opposed and, correspondingly, a respective purging gas pipe of a purging device that is attached by a respective fastening flange projects into the flow socket from opposed sides. Inasmuch as only a reduced number of purging gas pipes in comparison to the openings and fastening flanges is required, the openings that are not needed can be closed off with closure lids that are attached to the fastening flange.

The fastening flange or the fastening flanges are preferably embodied as one piece together with the flow socket. The fastening flange or fastening flanges are located preferably at the exterior side of the flow socket. The fastening flange can be embodied as a pipe section that projects laterally from the flow socket and adjoins immediately the opening in the flow socket. The fastening flange moreover can be configured with fastening devices for fastening the purging gas pipe or the closure lid, for example, provided with one or a plurality of screw sleeves for receiving screws by means of which the purging gas pipe or the closure lid can be fastened.

According to a further advantageous embodiment, a support ring which is a carrier of the purging gas pipe can be inserted into the fastening flange. The support ring can be manufactured, for example, of steel. Advantageously, the support ring is fixedly connected to the purging gas pipe, for example, is welded to the purging gas pipe. Between the support ring and the flange inner wall, a sealing ring can be located in order to ensure a seal tightness of flow even with purging gas pipe inserted in the flow socket and to avoid leakage air flows of the outflowing purified medium from the interior of the filter medium body.

According to a further advantageous embodiment, at the support ring the adjustable valve is secured which is a component of the purging device and by means of which the purging medium flow is adjustable. For example, it can be expedient to provide a thread with which the valve is screw-connected to an axial extension of the support ring projecting from the fastening flange. For example, the thread is an external thread; correspondingly, the valve is provided with an inner thread which can be screwed onto the thread of the support ring. The thread is advantageously provided at the valve in a valve housing of the valve.

According to a further preferred embodiment, the flow socket, provided at its wall with the at least one opening for receiving the purging gas pipe, is embodied as an attachment socket which is connected to a discharge pipe of the filter device. By means of the discharge pipe, the purified fluid is discharged from the inwardly positioned flow chamber in the filter medium body. The attachment socket is embodied separate from this discharge pipe but is connected with the discharge pipe so that the attachment socket forms an extension of the discharge pipe for discharging the purified fluid. Advantageously, the attachment socket and the discharge pipe have the same diameter.

This embodiment has the advantage that the attachment socket as an optional component can be connected to a filter device so that standard filter devices can be furnished optionally with a purging device. For this purpose, it is only required to connect the attachment socket to the discharge pipe and optionally guide the purging gas pipe of the purging device through the opening in the wall of the attachment socket and connect it to the fastening flange at the attachment socket. In case the purging device is not required, as described above, the purging gas pipe can be removed from the opening in the wall of the attachment socket and from the fastening flange, and the opening can be closed by a closure lid.

The attachment socket is in particular fixedly connected to the discharge pipe, for example, by welding or gluing or by means of a one-piece and monolithic manufacture of attachment socket and discharge pipe, for example, of plastic material or another material such as metal that can be thermally liquefied, in an injection molding process or by an additive manufacturing process such as 3D printing.

The flow or attachment socket is advantageously configured as a plastic component. However, also conceivable is an embodiment as a metal component. The discharge pipe can also be embodied as a plastic or metal component. In a preferred embodiment, the attachment socket and the discharge pipe are manufactured of the same material.

The filter housing, according to a further advantageous embodiment, is embodied as a plastic component and is comprised, for example, of a thermoplastic plastic material, such as e.g. polyamide, and optionally can be reinforced with glass fibers.

The support ring forms in this embodiment a fastening element that is connectable to the fastening flange.

According to a further advantageous embodiment, the filter element comprises a first filter medium body and a second filter medium body embodied as a main filter medium body and as a secondary filter medium body. Main and secondary filter medium bodies are flowed through one after another by the fluid to be purified wherein the secondary filter medium body is arranged downstream of the main filter medium body. Advantageously, main and secondary filter medium bodies each are embodied hollow cylindrical and the secondary filter medium body is inserted into the main filter medium body. In radial direction, the two filter medium bodies are thus arranged one after another wherein, radially from the exterior to the interior, first the main filter medium body and subsequently the secondary filter medium body is flowed through by the fluid to be purified. The interior in the secondary filter medium body forms the inwardly positioned flow chamber from which the purified fluid is discharged through the flow socket.

According to yet another advantageous embodiment, the filter housing is provided with a dust discharge valve that, in filtration operation of the filter device, is in closed position but is opened for cleaning of the filter medium body and discharge of the detached deposits. The dust discharge valve is embodied, for example, as a duckbill valve.

BRIEF DESCRIPTION OF THE DRAWINGS

Further advantages and expedient embodiments can be taken from the additional claims, the figure description, and the drawings.

DESCRIPTION OF PREFERRED EMBODIMENTS

Figure 1:
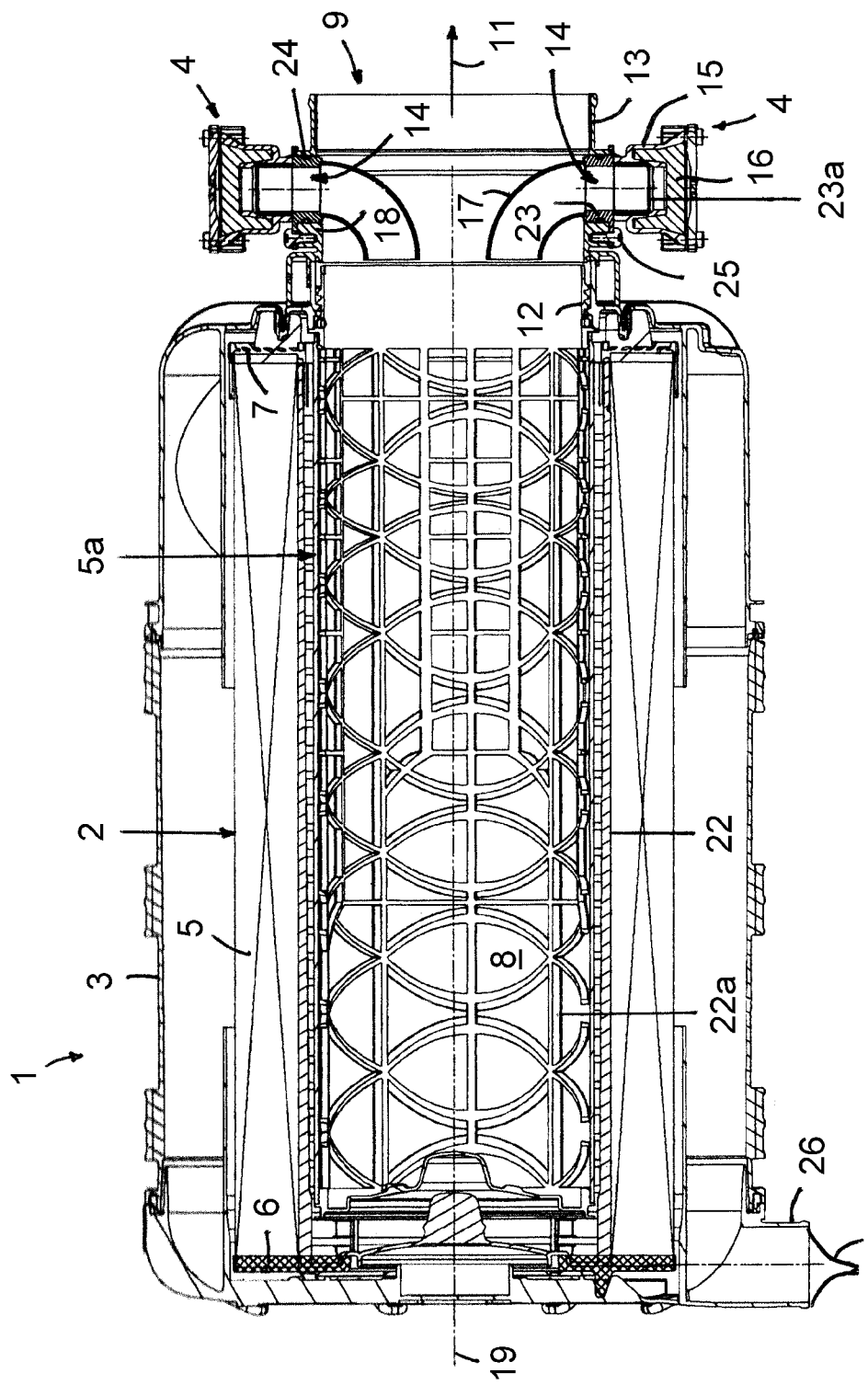
FIG. 1 shows a longitudinal section of a filter device for air filtration, with a hollow cylindrical filter element, wherein at an axial end face a discharge pipe for discharging the purified air is arranged and an attachment socket with a purging device adjoins the discharge pipe.
Figure 2:
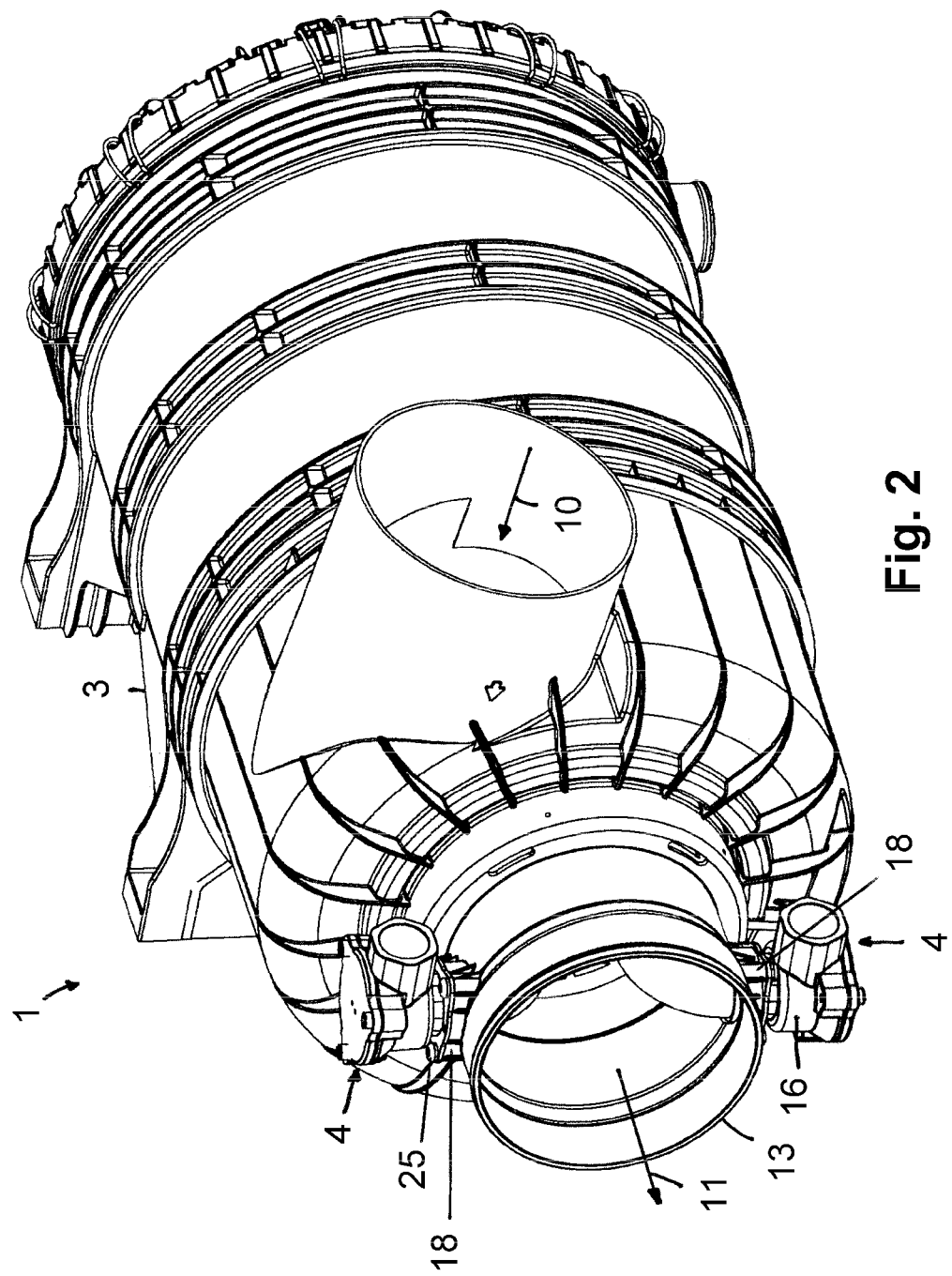
FIG. 2 shows the filter device in perspective view.
Figure 3:
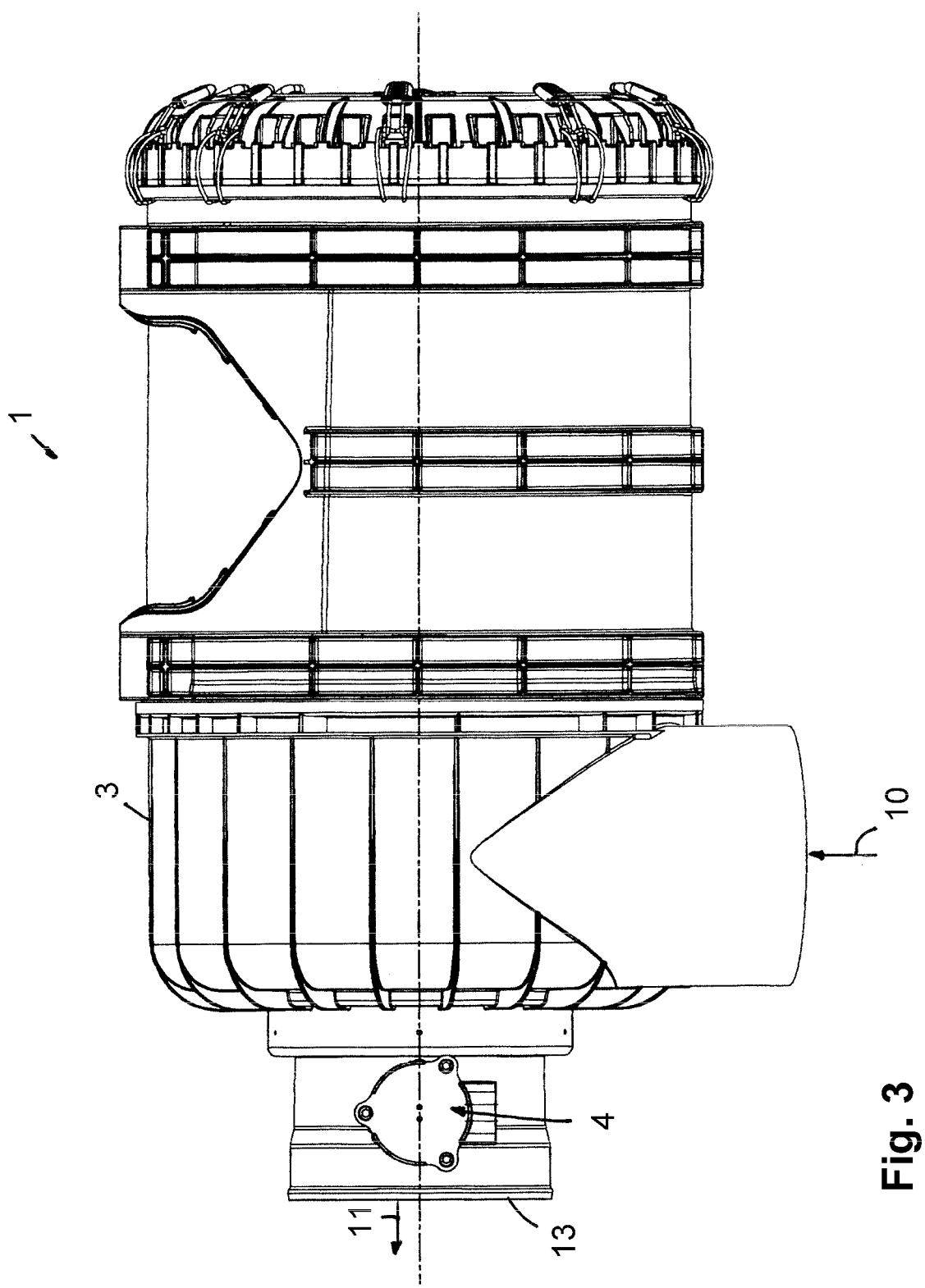
FIG. 3 shows the filter device in plan view.

The embodiment illustrated in FIGS. 1 to 3 shows a filter device 1 for air filtration of the combustion air which can be supplied to an internal combustion engine in a vehicle. Filter device 1 comprises a hollow cylindrical filter element 2 in a filter housing 3. Also, the filter device 1 is provided with a purging device 4 which enables cleaning off deposited dirt particles from a filter medium body 5 of a filter element 2.

The filter medium body 5 forms a main filter medium body through which the fluid to be purified flows radially from the exterior to the interior. A secondary filter medium body 5a is inserted into the main filter medium body 5 and is also embodied hollow cylindrical. For a radial flow through the filter element from the exterior to the interior, the air to be purified flows first through the main filter medium body 5 and immediately subsequently through the secondary filter medium body 5a. The main filter medium body 5 is closed at its axial opposite end faces by end discs 6 and 7 and comprises also at its radial inwardly positioned side a supporting central tube 22. The secondary filter medium body 5a also comprises a supporting central tube which is identified by reference character 22a. The entire end face of the secondary filter medium body 5a is closed off by an end disc 6a which is arranged axially opposite to the discharge side 9 and is arranged adjacent to the end disc 6 of the main filter medium body 5.

The purified fluid collects within the inwardly positioned flow chamber 8 in the filter element 2 and is discharged therefrom in the direction of arrow 11 through a socket-shaped discharge pipe 12 which is positioned at the discharge side 9 of the filter device 1. The discharge direction according to arrow 11 coincides with the longitudinal axis 19 of the filter device 1.

The flow or attachment socket 13 of identical diameter adjoins axially the socket-shaped discharge pipe 12, which is located at the discharge side 9 of the filter device 1, and is fixedly connected to the discharge pipe 12, in particular by welding or gluing. The flow socket 13 serves for receiving the purging device 4. This embodiment makes it possible to combine the purging devices 4 by means of the flow socket 13 with different filter devices 1, wherein optionally also retrofitting of a filter device 1 with a purging device 4 is possible.

The purging device 4 comprises a valve 16 for regulating the purging medium, in particular compressed air, wherein the purging medium is guided via a pressure tank, not illustrated, and a pressure line to the valve 16 and further to a purging gas pipe 17 in the form of a pipe elbow. The valve 16 of the purging device 4 is located radially outside of the flow socket 13, wherein the curved purging gas pipe 17 deflects the purging medium by 90° axially in the direction of the inwardly positioned flow chamber 8. Optionally, in the flow chamber 8 a distribution element may be arranged that distributes the impacting purging medium in radial direction so that the purging medium exerts a pressure pulse on the inner side of the filter medium body and, correspondingly, deposits at the exterior side of the filter medium body become detached.

In the wall of the flow socket 13, an opening 14 is provided through which the purging gas pipe 17 is guided. For fastening the purging gas pipe 17 to the flow socket 13, a fastening flange 18 is provided at the exterior side of the flow socket 13 and is embodied as one piece together with the flow socket 13 and frames the opening 14 like a collar or socket.

A support ring 23 is inserted into the fastening flange 18 and is connected fixedly to the purging gas pipe 17. A sealing ring 24 is provided between the exterior side of the support ring 23, preferably manufactured of steel, and the flange inner wall of the fastening flange 18. The support ring 23 is embodied as one piece with an axial extension 23a which is located outside of the fastening flange and outside of the flow socket 13. The extension 23a comprises an exterior thread onto which the valve housing 15 of the valve 16 of the purging device 4 can be screwed with an inner thread. The curved section or pipe elbow 17 and the support ring 23 including the extension 23a form as a whole a purging gas pipe for introducing a compressed air pulse for cleaning the filter medium body 5.

The fastening of the purging device 4 to the flow socket 13 is realized by means of the fastening flange 18 which comprises several screw sleeves for receiving fastening screws 25 which clamp a projecting collar at the support ring 23. In this way, the support ring 23 including pipe elbow 17 and valve 16 is connected fixedly to the flow socket 13. For detaching the purging device 4, it is sufficient to unscrew the fastening screws 25 whereupon the purging gas pipe can be removed from the opening 14.

In the illustrated embodiment, a total of two openings 14 are provided in the wall of the flow socket 13 at diametrically opposed sides. A purging device 4 is inserted into each opening 14. This makes it possible to introduce a greater pressure air pulse into the filter device 1 for cleaning the filter medium body 5.

At the filter housing 3, a discharge socket 26 with a duckbill valve 27 arranged thereat is provided. By means of the discharge socket 26 and the duckbill valve 27, contaminants and deposits that have been detached by the purging process can be discharged from the filter housing 3.

As an alternative to the purging devices 4, the openings 14 in the flow socket 13 can also be closed off by a closure lid. Such a closure lid can be fastened to the fastening flange 18.

What is claimed is:

1. A filter device comprising:
   a filter housing;
   a filter element received in the filter housing and comprising one or more filter medium bodies and a flow chamber, wherein the flow chamber is at least partially enclosed by the one or more filter medium bodies;
   a flow socket configured to discharge a purified medium from the flow chamber, wherein the flow socket comprises a wall comprising at least two openings; and
   a fastening flange arranged at the wall of the flow socket adjacent to the opening, wherein the fastening flange is configured to detachably fasten a purging gas pipe of a purging device to the flow socket, wherein the at least two openings each have correlated therewith one of said fastening flange.

2. The filter device according to claim 1, further comprising a fastening element arranged at the purging gas pipe and connectable to the fastening flange.

3. The filter device according to claim 1, further comprising a discharge pipe disposed at the filter housing, wherein the flow socket is an attachment socket connected to the discharge pipe, and wherein the opening in the wall of the flow socket is configured to receive the purging gas pipe.

4. The filter device according to claim 3, wherein the attachment socket is fixedly connected to the discharge pipe.

5. The filter device according to claim 3, wherein the attachment socket is welded or glued to the discharge pipe.

6. The filter device according to claim 3, wherein the attachment socket and the discharge pipe are manufactured as one monolithic piece.

7. The filter device according to claim 1, wherein the purging device comprises an adjustable valve configured to regulate a purging medium.

8. The filter device according to claim 1, wherein the filter element is a round filter element.

9. The filter device according to claim 1, wherein the one or more filter medium bodies include a main filter medium body and a secondary filter medium body, wherein the secondary filter medium body is arranged downstream of the main filter medium body in a flow direction of a medium to be filtered.

10. The filter device according to claim 1 embodied as a gas filter.

11. The filter device according to claim 1 embodied as an air filter.

12. The filter device according to claim 1, further comprising a fastening element arranged at the purging gas pipe and connectable to the fastening flange.

13. The filter device according to claim 1, further comprising a discharge pipe disposed at the filter housing, wherein the flow socket is an attachment socket connected to the discharge pipe, and wherein the opening in the wall of the flow socket is configured to receive the purging gas pipe.

14. The filter device according to claim 13, wherein the attachment socket is fixedly connected to the discharge pipe.

15. The filter device according to claim 13, wherein the attachment socket is welded or glued to the discharge pipe.

16. A filter device comprising:
   a filter housing;
   a filter element received in the filter housing and comprising one or more filter medium bodies and a flow chamber, wherein the flow chamber is at least partially enclosed by the one or more filter medium bodies;

a flow socket configured to discharge a purified medium from the flow chamber, wherein the flow socket comprises a wall comprising an opening;

a fastening flange arranged at the wall of the flow socket adjacent to the opening, wherein the fastening flange is configured to detachably fasten a purging gas pipe of a purging device to the flow socket; and a support ring as a carrier of the purging gas pipe, wherein the support ring is insertable into the fastening flange.

17. The filter device according to claim 16, further comprising a sealing ring arranged between the support ring and a flange inner wall of the fastening flange.

* * * * *